(12) United States Patent
Lu

(10) Patent No.: US 6,508,167 B1
(45) Date of Patent: Jan. 21, 2003

(54) ROTATABLE BROILING DRIVER

(76) Inventor: Chien-Chang Lu, P.O. Box 90, Tainan City (TW)

( * ) Notice: Subject to any disclaimer, the term of this patent is extended or adjusted under 35 U.S.C. 154(b) by 0 days.

(21) Appl. No.: 10/225,360

(22) Filed: Aug. 22, 2002

(51) Int. Cl.[7] .......................... A47J 37/00; A47J 37/04; A47J 37/08
(52) U.S. Cl. ...................... 99/421 H; 99/419; 99/421 A
(58) Field of Search ............................. 99/331–333, 339, 99/340, 419–421 V, 426, 444–450, 481, 482; 126/25 R, 9 R, 41 R; 426/523

(56) References Cited

U.S. PATENT DOCUMENTS

| | | | | |
|---|---|---|---|---|
| 3,113,504 A | * | 12/1963 | Reed | 99/421 H |
| 3,247,827 A | * | 4/1966 | Cremer | 99/421 H |
| 3,733,999 A | * | 5/1973 | Bernstein | 99/339 X |
| 4,104,959 A | * | 8/1978 | Demerson | 99/421 H |
| 4,598,690 A | * | 7/1986 | Hsu | 126/25 R |
| 4,815,367 A | * | 3/1989 | Hanson et al. | 99/421 H |
| 4,982,657 A | * | 1/1991 | Ghenic | 99/421 A |
| 5,007,403 A | * | 4/1991 | Chen | 219/401 |
| 5,172,628 A | * | 12/1992 | Pillsbury | 99/421 H |
| 5,427,017 A | * | 6/1995 | Cheung | 99/385 |
| 5,755,153 A | * | 5/1998 | Su | 99/421 H |
| 5,782,168 A | * | 7/1998 | Krhnak | 99/340 |
| 6,213,004 B1 | * | 4/2001 | Franco | 99/421 H |

* cited by examiner

*Primary Examiner*—Timothy F. Simone

(57) ABSTRACT

A rotatable broiling driver includes a positioning plate, an accommodating member, a transmitting member, a motor, a battery base, and an outer cover. The accommodating member is provided with a changeover switch. The transmitting member has one end formed with an insert groove for a spit to be inserted therein and the other end receiving the spindle of the motor. The battery base has an electric wire respectively connected with the motor and the changeover switch. In using, after the broiling driver is assembled with a broiler and the spit inserted in the transmitting member, press the change-over switch to an ON position to start the motor to let its spindle drive the transmitting member rotate together with the spit to carry out broiling, having a small size to be carried about conveniently and applicable to any site.

1 Claim, 5 Drawing Sheets

ROTATABLE BROILING DRIVER

BACKGROUND OF THE INVENTION

1. Field of the Invention

This invention relates to a rotatable broiling driver, particularly to one which is wireless and has a small size, convenient to be carried about and assembled with any broiler for use, and able to function normally in case of power outage and possible to be used at any site.

2. Description of the Prior Art

A conventional broiler 1, as shown in FIG. 1, includes a spit 10 positioned on a broiling oven 11, having one end bent connected with a handle 100. After the spit 10 pricks food to be broiled and is spanned on the two side plates 110 of the broiling oven 11, the handle 100 is manually turned around together with the spit 10 to let the food on it receive balanced heat. However, such a conventional broiler 1 must have its spit 10 turned around continually by hand in order to let the food on it heated and broiled in a balanced condition, taking too much labor inconvenient to use.

In view of this condition, an electrically automatic rotary broiler 2 has been designed and used. The automatic rotary broiler 2, as shown in FIG. 2, includes an oven 20 assembled with a driving device 21 on the outer wall of its side plate 200. The driving device 21 consists of a drive motor 211 having an insert hole 212 at the position of its spindle for the tip of a spit 22 to be inserted therein. The drive motor 211 is connected with an electric wire 213 having its plug connected with a power which starts the drive motor 211 to drive the spit 22 to rotate automatically. Nevertheless, such a conventional automatic rotary broiler 2 has the following disadvantages.

1. It is provided with an electric wire preset in length, which has to be coupled with AC power for use, so it is usable only at home, impossible to be carried out outdoors for use.
2. It will become useless in case of power outage.
3. Its excessively long electric wire may bring forth hindrance and even if worse, trip someone who is walking around.
4. If the electric wire is located very close to the oven and heated for a long period of time, its plastic coat may deform or fall off and most likely result in short circuit to cause a fire.

SUMMARY OF THE INVENTION

The objective of the invention is to offer a rotatable broiling driver which is wireless and has a small size, convenient to be carried about.

The feature of the invention is a positioning plate provided with at least an engage stud, at least an insert member and a through hole; an accommodating member threadably assembled with the positioning plate, provided with a chamber having an opening facing the through hole of the positioning plate, having its rear side bored with an insert hole and having a change-over switch fixed on an outer side; a transmitting member received in the chamber of the accommodating member, having a front portion provided with an insert groove and a rear side bored with an insert hole, and the insert groove having one end inserted in the through hole of the positioning plate and the insert hole aligned to the insert hole in the rear side of the chamber of the accommodating member; a motor threadably combined with the accommodating member, having its spindle inserted through the insert hole of the accommodating member and further into the insert groove of the transmitting member; a battery base fixed on one side of the motor for receiving a battery therein, connected with the motor and the change-over switch by means of an electric wire; an outer cover covering the motor as well as the battery base and fixedly screwed together with the positioning plate, having a battery base cover easy to be swung open at a corresponding location of the battery base and an opening at a corresponding location of the change-over switch.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
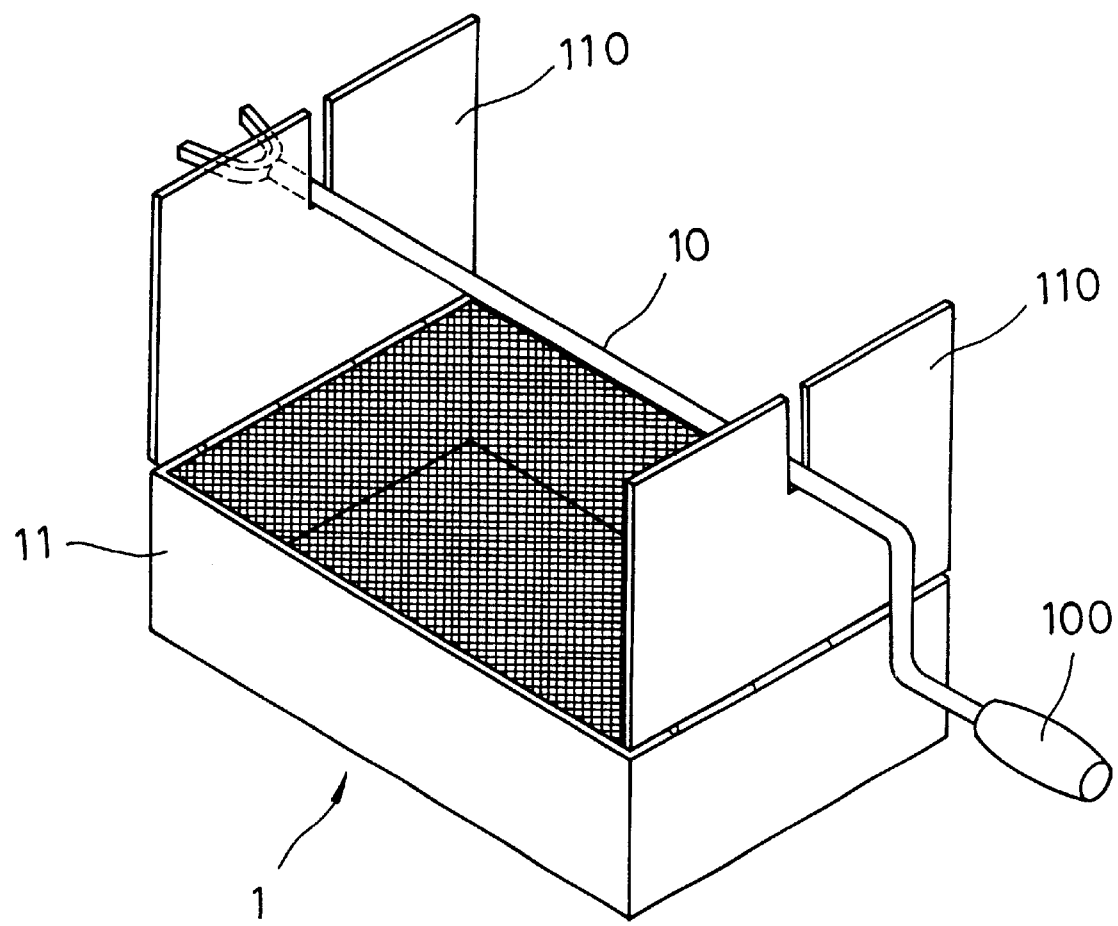
FIG. 1 is a perspective view of a conventional broiler.
Figure 2:
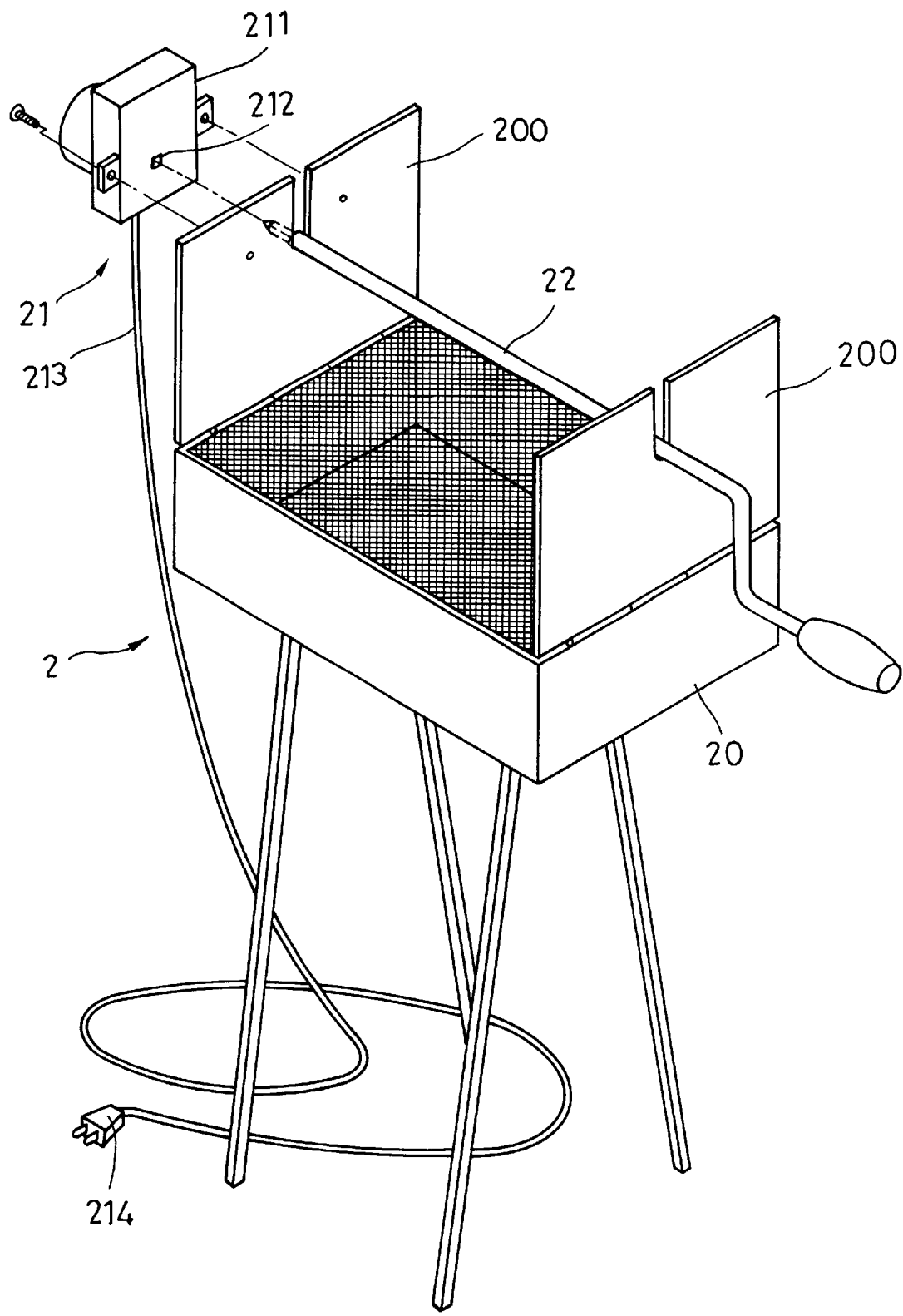
FIG. 2 is a perspective view of another conventional broiler.
Figure 3:
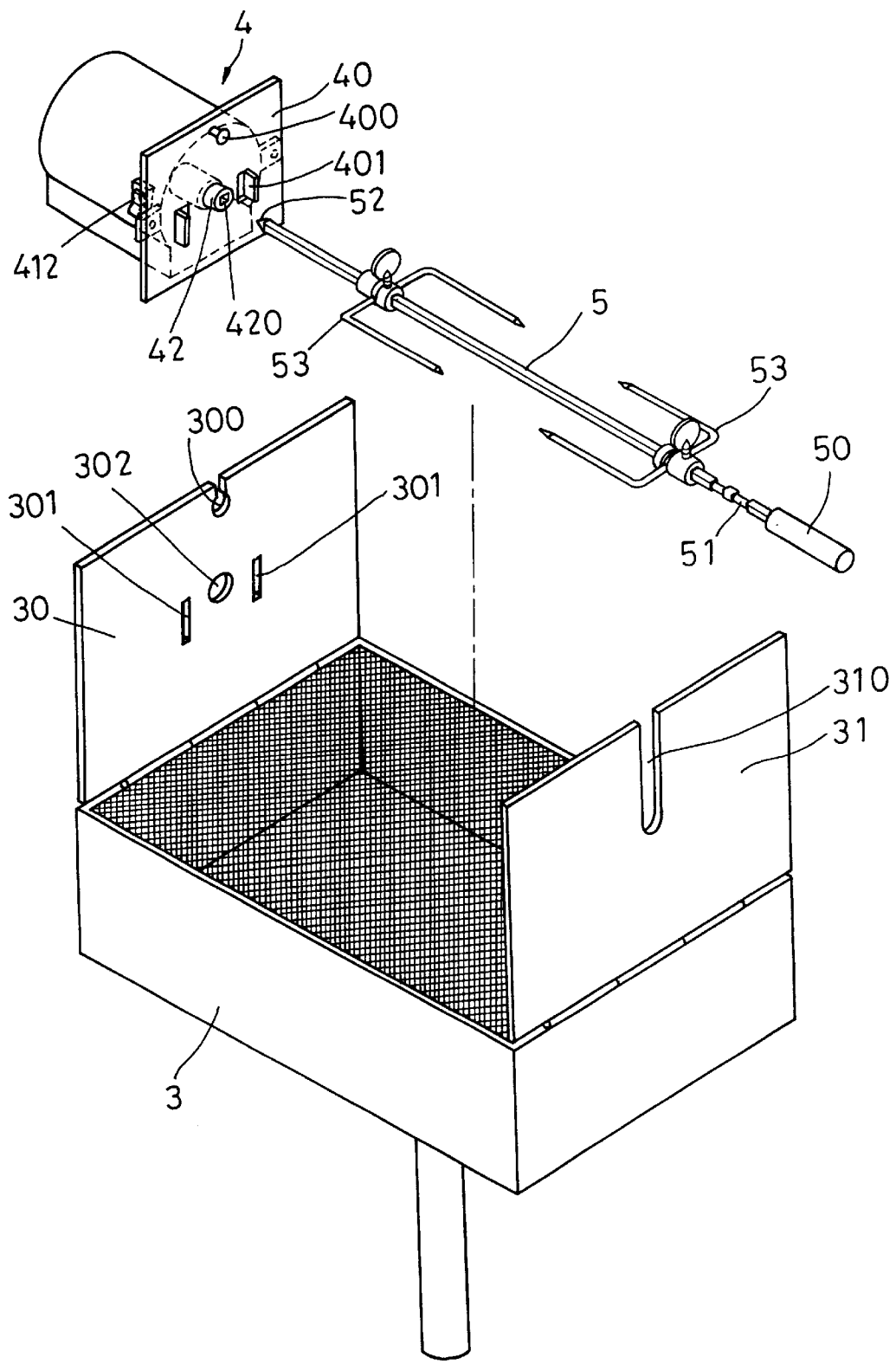
FIG. 3 is an exploded perspective view of a broiler and a rotatable broiling driver in the present invention.
Figure 4:
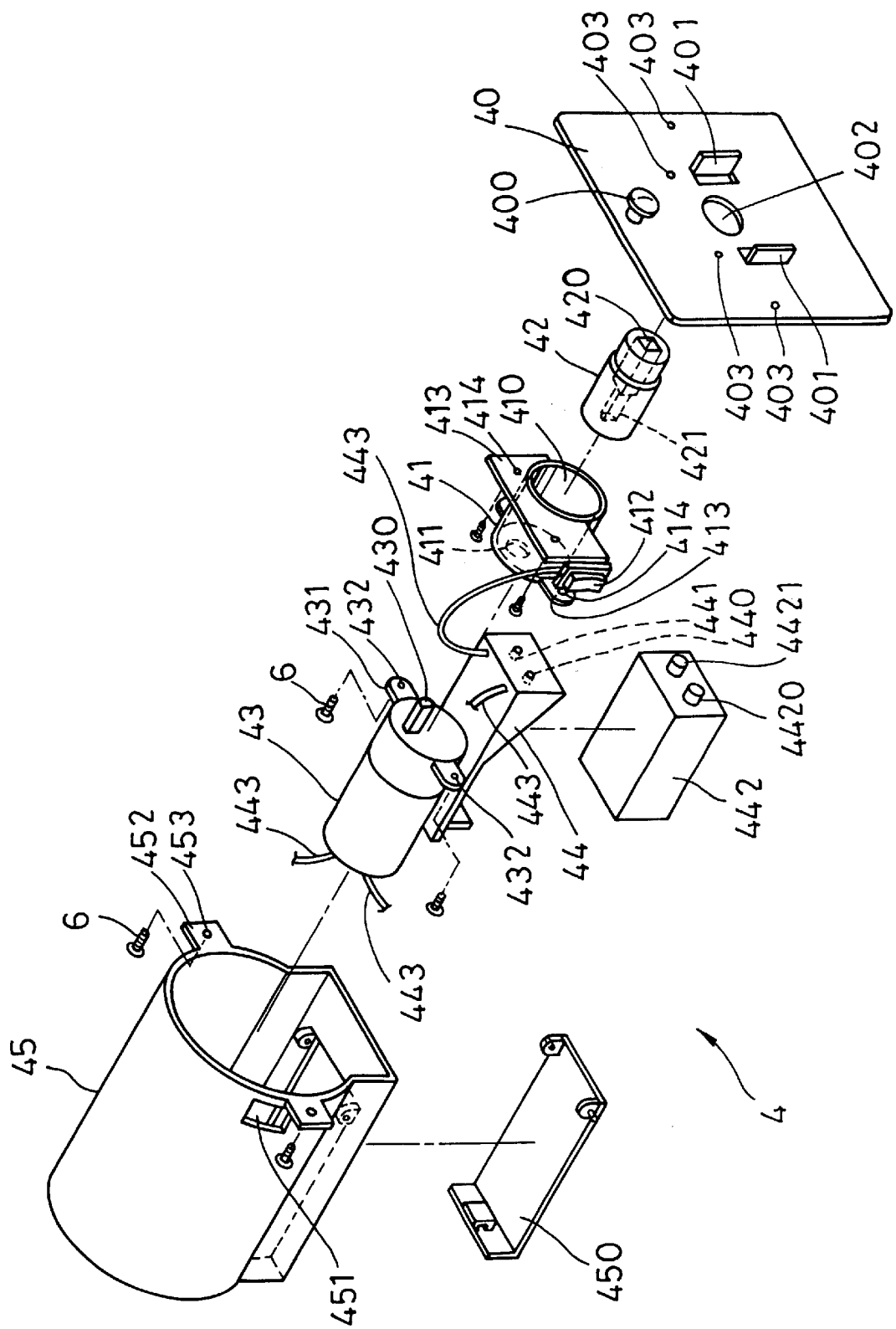
FIG. 4 is an exploded perspective view of the rotatable broiling driver in the present invention; and, FIG. 5 is a front view of the rotatable broiling driver used in a broiler in a using condition in the present invention.

A preferred embodiment of a rotatable broiling driver in the present invention, as shown in FIGS. 3 and 4, is to be combined with an oven 3, and a spit 5.

The oven 3 is provided with a left and a right frame plate 30 and 31 at the opposite sides. The left frame plate 30 is bored with an engage groove 300 at the central upper end and at least one insert hole 301 at proper positions and a through hole 302 at a proper location in the center, while the right frame plate 31 is formed with a notch 310 at a central upper end.

The rotatable broiling driver 4 is to be assembled on the left frame plate 30 of the oven 3, composed of a positioning plate 40, an accommodating member 41, a transmitting member 42, a motor 43, a battery base 44 and an outer cover 45.

The positioning plate 40 is vertical, having an engage stud 400 secured on an upper outer side and at least one insert member 401 at a lower outer side. The engage stud 400 is to be engaged in the engage groove 300 of the left frame plate 30, while the insert members 401 are to be inserted in the insert holes 301 of the left frame plate 30. Besides, the positioning plate 40 is bored with a through hole 402 in the center to match with the through hole 302 of the left frame plate 30 and a plurality of screw holes 403.

The accommodating member 41 to be threadably assembled with the positioning plate 40 is formed with a chamber 410 having its opening aligned to the through hole 402 of the positioning plate 40 and an insert hole 411 bored at a proper location in a rear side. The accommodating member 41 is fixed with a change-over switch 412 at a proper position on the outer side and an end plate 413 at the front end, having plural screw holes 414 to be respectively screwed together with the screw holes 403 of the positioning plate 40 by bolts 6.

The transmitting member 42 is shaped as a round rod to be received in the accommodating member 410, having a polygonal insert groove 420 in a front portion and an insert hole 421 in a rear portion. The end of the insert groove 420 has a comparatively small outer diameter, inserted through the through hole 402 of the positioning plate 40, and the insert hole 421 is aligned to the through hole 411 in the rear side of the chamber 410 of the accommodating member 41.

The motor 43 threadably assembled with the accommodating member 41 has its spindle 430 inserted through the insert hole 411 of the accommodating member 41 and further into the insert hole 421 of the transmitting member 42. The motor 43 is fixed at the front end with at least one lug 431 respectively having a screw hole 432 to be screwed with the screw holes 414 of the accommodating member 41 by bolts 6.

The battery base 44 is secured on an outer side of the motor 43, having a positive and a negative terminal 440, 441. The battery base 44 is fitted inside with a battery 442 having a positive and a negative terminal 4420, 4421 respectively connected with the positive and the negative terminal 440, 441 of the battery base 44. Further, the battery base 44 is connected with the motor 43 and the changeover switch 412 of the accommodating member 41 by means of an electric wire 443.

The outer cover 45 covers the motor 43 and the battery base 44 and is firmly screwed together with the positioning plate 40, provided with a battery base cover 450 easy to be swung open at the corresponding position of the battery base 44 and an opening 451 at the corresponding position of the change-over switch 412. The outer cover 45 is further fixed on the outer side with at least one combining member 452 respectively having a screw hole 453 to be screwed together with the screw holes 403 of the positioning plate 40 by bolts 6.

The spit 5 is provided with a handle 50 at an outer end, having an annular groove 51 formed near the handle 50 to be fitted with the notch 310 of the right frame plate 31. The spit 5 is formed at the outer end with tip 52 having the same shape as the insert groove 420 of the transmitting member 42. The spit 5 is fitted thereon with a pair of auxiliary tines 53 facing each other.

Figure 5:
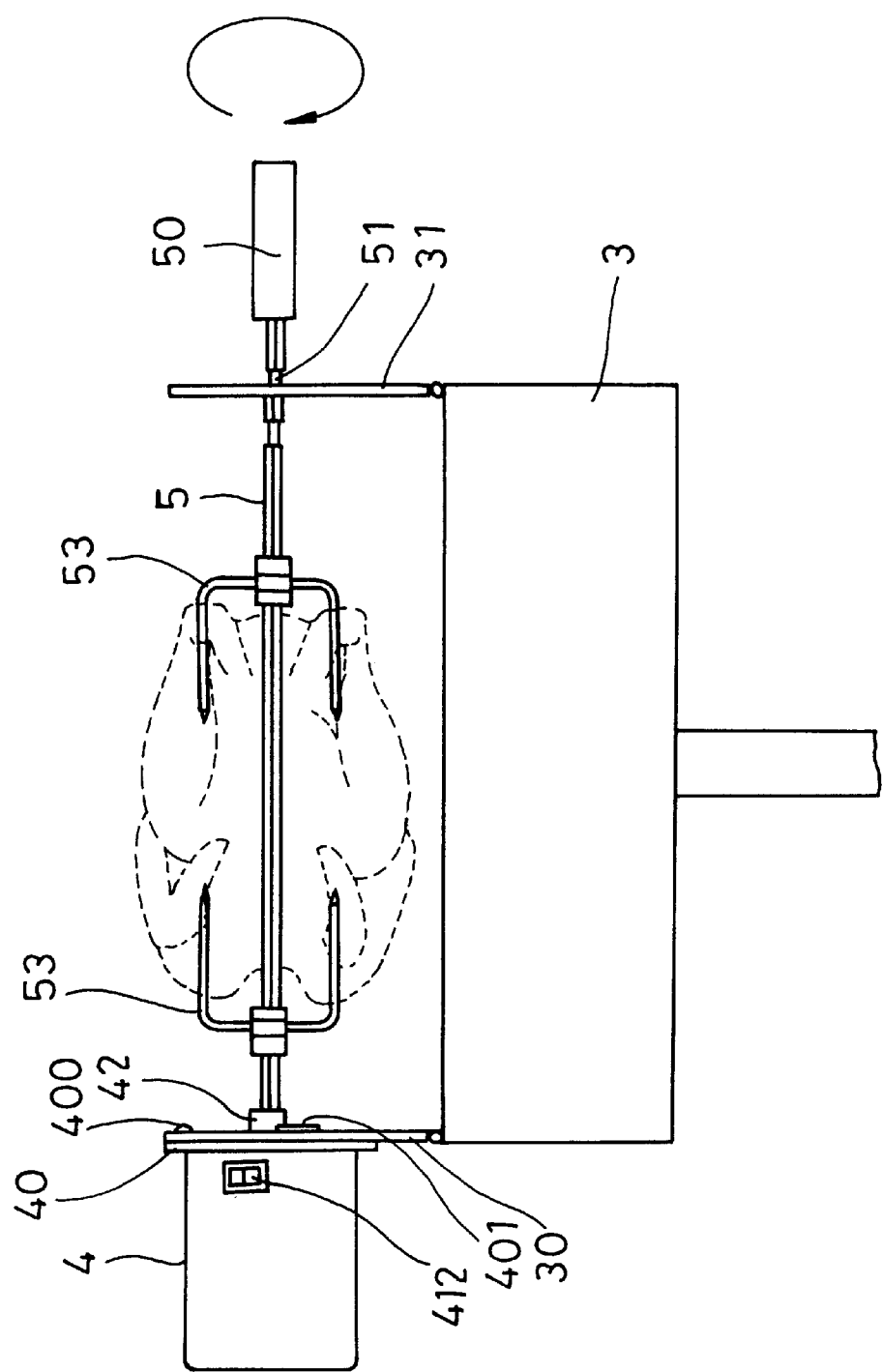

In assembling, as shown in FIGS. 3, 4 and 5, firstly, the motor 43 of the driver 4 is threadably combined with the accommodating member 41 by bolts 6, letting the spindle 430 of the motor 43 inserted through the insert hole 411 of the accommodating member 41. Next, the transmitting member 42 is put and received in the chamber 410 of the accommodating member 41, letting the spindle 430 of the motor 43 inserted in the insert hole 421 of the transmitting member 42, and the opening of the chamber 410 of the accommodating member 41 as well as the insert groove 420 of the transmitting member 42 aligned to the through hole 402 of the positioning plate 40. Then, the accommodating member 41 is fixedly screwed together with the positioning plate 40, and lastly the outer cover 45 is covered over the motor 43 and the battery base 44 threadably secured with the positioning plate 40 to finish making up the driver 4 to be assembled with the oven 3 for use.

In using and operating, as shown in FIGS. 3 and 5, firstly, swing open the battery base cover 450 of the outer cover 45 and fit the battery 442 in the battery base 44 and then close it up. Subsequently, the driver 4 is assembled on the left frame plate 30 of the oven 3 by inserting the engage stud 400 and the insert members 401 of the positioning plate 40 respectively in the engage groove 300 and the insert slots 301 of the left frame plate 30. When carrying out broiling, food to be broiled is pricked on the spit 5 and has its opposite sides stabilized by the auxiliary tines 53. Then, the spit 5 has its tip 52 inserted in the insert groove 420 of the transmitting member 42, and its annular groove 51 engaged with the notch 310 of the right frame plate 31.

At this time, only press the change-over switch 412 to an ON position to start the motor 43 and the spindle 430 of the motor 43 will drive the transmitting member 42 to rotate together with the spit 5. On the contrary, to stop the spit 5 from rotating, simply press the changeover switch 412 to an OFF position to stop the driver 4 and the spit 5 from operating and then remove the spit 5 from the oven 3.

As can be understood from the above description, this invention has the following advantages.

1. It can be simply assembled with a broiler for use, easy and convenient in handling.
2. It has a small size, convenient to be carried about and used in the open air and applicable to any site.
3. It employs a dry battery as a power, requiring no electric wire, able to function normally in case of power outage and available at any site.
4. It is convenient to be assembled with any kind of broiler.
5. The battery base cover of the outer cover is easy to be swung open for facilitating replacing the battery.

While the preferred embodiment of the invention has been described above, it will be recognized and understood that various modifications may be made therein and the appended claims are intended to cover all such modifications that may fall within the spirit and scope of the invention.

What is claimed is:

1. A rotatable broiling driver comprising:

a positioning plate provided with at least one engage stud, at least one insert member and a through hole;

an accommodating member threadably assembled with said positioning plate, said accommodating member formed with a chamber, said chamber having an opening aligned to said through hole of said positioning plate, said chamber bored with an insert hole in a rear side, a change-over switch fixed on one side of said accommodating member;

a transmitting member received in said chamber of said accommodating member, said transmitting member formed with an insert groove in a front portion and an insert hole in a rear portion, said insert groove having one end inserted through said through hole of said positioning plate, said insert hole of said transmitting member aligned to said insert hole in the rear side of said chamber;

a motor threadably combined with said accommodating member, said motor having its spindle inserted through said insert hole of said accommodating member and further in said insert hole of said transmitting member;

a battery base secured on an outer side of said motor, said battery base fitted inside with a battery, said battery base provided with an electric wire, said electric wire connected with said motor and said change-over switch;

an outer cover covering said motor and said battery base, said outer cover threadably combined with said positioning plate, said outer cover provided with a battery base cover easy to be swung open, said battery base cover positioned at a corresponding location of said battery base, said outer cover bored with an opening at a corresponding position of said change-over switch; and, said rotatable broiling driver assembled with a broiler, food to be broiled pricked on a spit, said spit having its tip inserted in said insert groove of said transmitting member, said change-over switch pressed to an ON position to start said motor, said spindle of said motor driving said transmitting member rotate, said transmitting member actuating said spit to rotate to carry out broiling, said rotatable broiling driver having a small size to be carried about conveniently, said rotatable broiling driver convenient to be assembled with any kind of broiler, said rotatable broiling driver using a battery as a power, able to function normally in case of power outage, said rotatable broiling driver possible to be employed at any site.

* * * * *